UNITED STATES PATENT OFFICE.

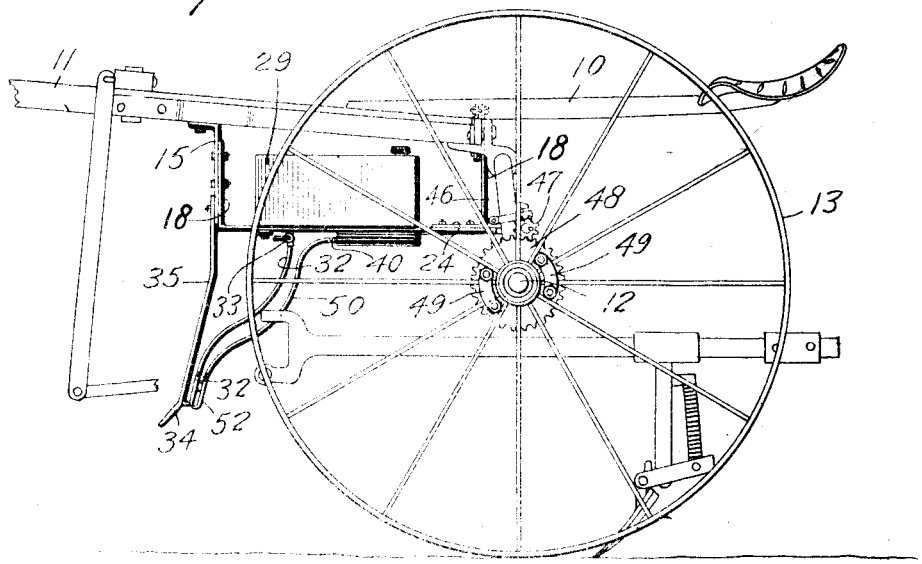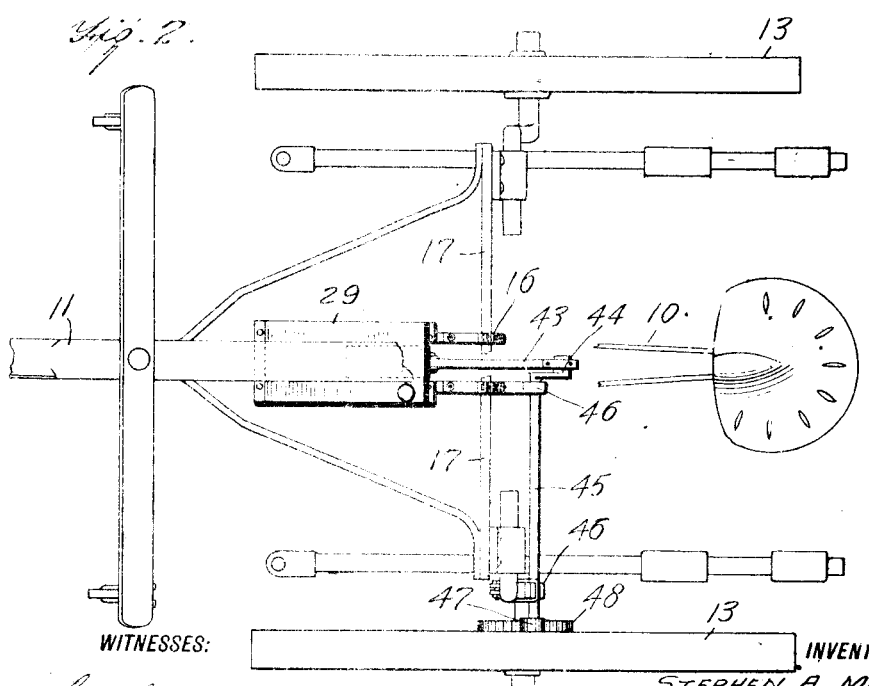

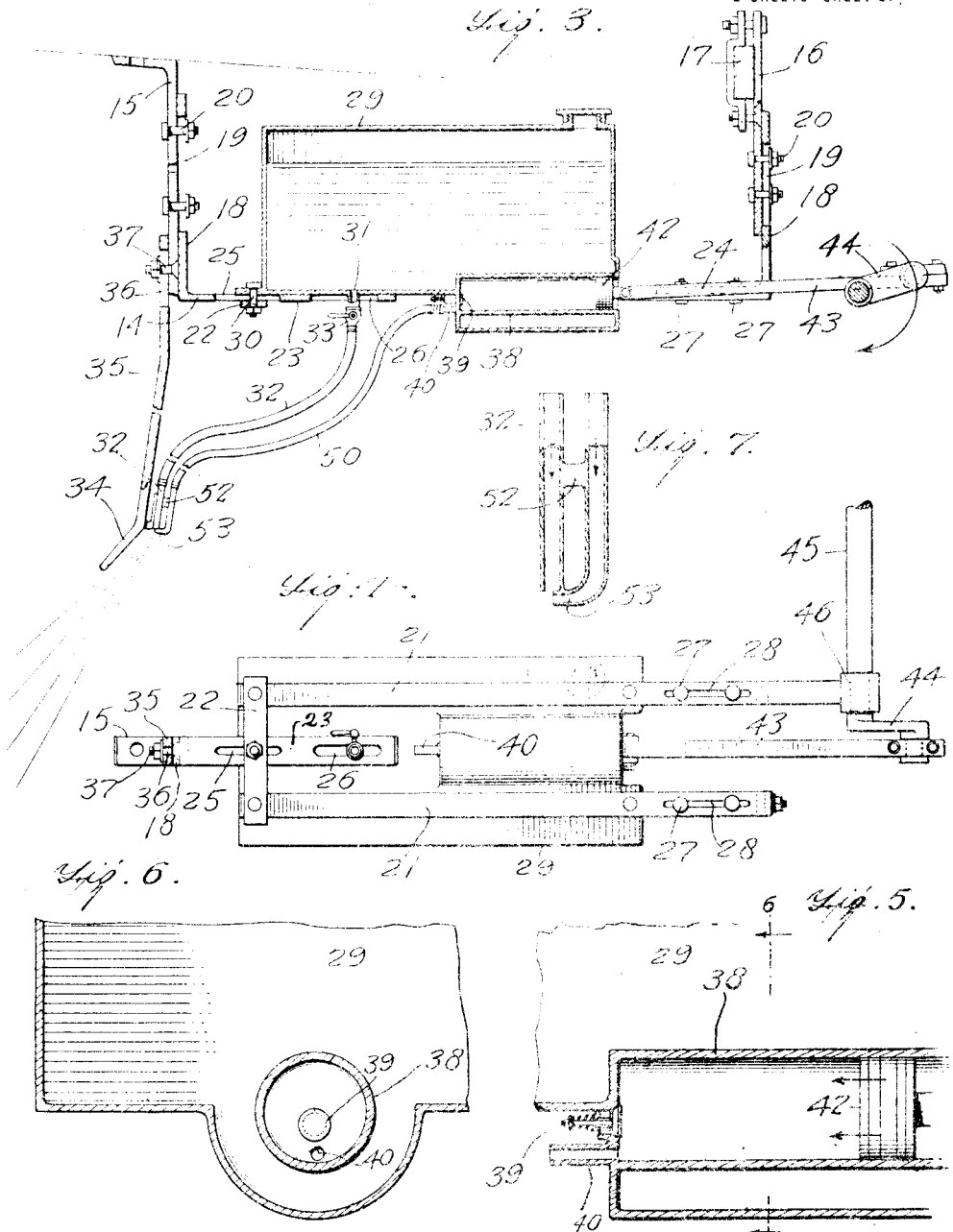

CHARLES L. KING AND STEPHEN A. McKIE, OF BROWNWOOD, TEXAS.

INSECT-DESTROYER.

1,176,464.  Specification of Letters Patent. Patented Mar. 21, 1916.

Application filed June 21, 1915. Serial No. 35,443.

*To all whom it may concern:*

Be it known that we, CHARLES L. KING and STEPHEN A. MCKIE, citizens of the United States, and residents of Brownwood, in the county of Brown and State of Texas, have invented an Improvement in Insect-Destroyers, of which the following is a specification.

The present invention relates to improvements in insect destroyers and more particularly to an apparatus adapted to be mounted upon an agricultural or other wheeled vehicle.

One object of the invention is the provision of an apparatus comprising a reservoir from which is fed an insecticide to a nozzle device, air pressure being used to generate a forceful jet at the nozzle for effectively distributing the insecticide over the area to be covered whereby various forms of insects may be destroyed.

Another object is to provide means automatically operated by the travel of the vehicle for actuating the air pump used in connection with the invention.

A still further object is the provision of an apparatus of the class described which is rendered adjustable so as to enable it to be applied to various forms of agricultural machines and other vehicles.

The inventive idea involved is capable of receiving a variety of mechanical expressions, one of which, for the purpose of illustrating the invention, is shown in the accompanying drawings, in which—

Figure 1 is a conventional side illustration of an agricultural machine, showing the invention applied thereto. Fig. 2 is a top plan view of Fig. 1. Fig. 3 is a longitudinal section of the apparatus showing the manner in which the same is supported on the vehicle. Fig. 4 is a bottom plan view thereof. Fig. 5 is an enlarged fragmentary longitudinal section taken through a portion of the reservoir which forms a part of the invention. Fig. 6 is a transverse section on the line 6—6 of Fig. 5, and Fig. 7 is a detail section of the nozzle device used in connection with the invention.

Referring more particularly to the drawings, the numeral 10 indicates generally an agricultural machine of any preferred construction, the same comprising the usual tongue or shaft 11, axle 12 and wheels 13, mounted thereon.

The apparatus which comprises the essential feature of this invention includes a substantially U-shaped frame, generally indicated by 14 and consisting of vertical supporting members 15 and 16 which are secured, respectively, to the tongue 11 and cross beam 17. The main portion of the frame consists of vertical brackets 18 having longitudinally extending slots 19 therein which are adapted to receive bolts 20 whereby said main portion may be vertically adjusted at will. The horizontal part of the frame 14 includes arms 21 arranged in parallel relation and connected at one end thereof by a cross brace 22. The vertical arms 18 of the frame are also provided with horizontal portions 23 and 24, the portion 23 extending between the arms 21 and provided with slots 25 and 26 therein for a purpose which will presently appear. The portions 24 carry bolts 27 which are adapted to extend through slots 28 formed in the arms 21 whereby the parts are relatively adjustable. An insecticide reservoir 29 is supported upon the arms 21 and connected to the horizontal portion 23 of one of the brackets 18 by means of a bolt 30 which extends through the slot 25 in said portion 23 and engages the cross brace 22 whereby the bracket 18 may be adjusted back and forth in order that the frame may be secured to any convenient part of the vehicle. The reservoir 29 is provided with an outlet 31 in the bottom thereof to which is connected a flexible pipe or hose 32 having at its upper end a valve 33 for controlling the flow of the insecticide therethrough. The lower end of the pipe 32 has secured thereto a suitable guard plate 34 carried by an arm 35 having a slot 36 in its upper end for receiving a bolt 37 whereby said arm may be vertically adjusted. This plate is employed for the purpose of protection from vegetation.

Formed integral with the reservoir 29 adjacent the bottom thereof is an air pump cylinder 38 provided in one end with the inlet valve 39 and outlet pipe 40, said cylinder being adapted to be surrounded by the liquid in the tank 29 so that the pump may be kept cool. A reciprocating piston 42 is mounted in the cylinder 38 and has connected thereto at one end the piston rod 43, the other end thereof being mounted upon the crank 44 of the shaft 45 which is journaled in bearings 46 and extends transversely of the vehicle. The end of the shaft 45 opposite to the crank 44 is provided with a small gear wheel 47 adapted to mesh with the large gear wheel 48 surrounding the axle 12 and secured to the adjacent wheel 13 by means of clips 49. It will thus be apparent from the foregoing description that rotation of the wheels 13 will transmit, through shaft 45 and crank 44, a reciprocating motion to the rod 43 which will alternately open and close the valve 39 thereby drawing air into the cylinder and discharging it, under pressure, through the outlet pipe 40. One end of a flexible pipe or hose 50 is connected to the outlet pipe 40 while the other end of said pipe is connected to the pipe 32 by a web 52 and is bent laterally at its extremity as indicated at 53. It will thus be seen that air under pressure passing through pipe 50 to its outlet end 53 will form a jet whereby the insecticide passing out of the pipe 32 will be effectively distributed over the area to be covered.

We claim:—

1. In an insect destroyer, the combination with a main vehicle frame and an axle therefor; of a plurality of supporting members depending from said main frame, a reservoir supporting frame connected to said supporting members and including angular members adapted for vertical adjustment relative to said supporting members, said supporting frame also including horizontal members, a connection between said members at one end thereof and adjustably secured intermediate its ends to one of said vertically adjustable members, the other ends of said horizontal members being adjustably secured to the other of said vertically adjustable members, a reservoir supported upon said horizontal members, a pump associated with said reservoir, and a nozzle device connected to said reservoir and pump for distributing insecticide from the former.

2. In an insect destroyer, the combination with a main vehicle frame and an axle therefor; of a plurality of supporting members depending from said main frame, a reservoir supporting frame connected to said supporting members and including angular members adapted for vertical adjustment relative to said supporting members, said supporting frame also including horizontal members, a connection between said members at one end thereof and adjustably secured intermediate its ends to one of said vertically adjustable members, the other ends of said horizontal members being adjustably secured to the other of said vertically adjustable members, a reservoir supported upon said horizontal members, a pump associated with said reservoir, a vertically adjustable arm connected to one of said adjustable members, and a nozzle device secured to said arm and connected to said reservoir and pump for distributing insecticide from the former.

3. In an insect destroyer, the combination with a main vehicle frame and an axle therefor; of a plurality of supporting members depending from said main frame, a reservoir supporting frame connected to said supporting members and including angular members adapted for vertical adjustment relative to said supporting members, said supporting frame also including horizontal members, a connection between said members at one end thereof and adjustably secured intermediate its ends to one of said vertically adjustable members, the other ends of said horizontal members being adjustably secured to the other of said vertically adjustable members, a reservoir supported upon said horizontal members, a pump associated with said reservoir, a crank shaft driven by said axle and having a bearing in one of the horizontal members of the supporting frame, a driven member secured at one end to said crank shaft and extending between said horizontal members of the supporting frame for operating said pump, and a nozzle device connected to said reservoir and pump for distributing insecticide from the former.

4. In an insect destroyer, the combination with a vehicle frame and an axle therefor; of a reservoir supporting frame connected to said vehicle frame and including vertically and horizontally adjustable members, a reservoir supported on said horizontal members, a pump forming a part of said reservoir, a crank shaft driven by said axle, means connected to said crank shaft and extending between said horizontal members for operating said pump, and a spraying device connected to said reservoir and pump for distributing insecticide from the former.

CHARLES L. KING.
STEPHEN A. McKIE

Witnesses:
B. H. CUNNINGHAM,
W. A. CROPP.